(12) United States Patent
Alley

(10) Patent No.: US 6,874,385 B2
(45) Date of Patent: Apr. 5, 2005

(54) BICYCLE HANDLEBAR-FORK CLAMP ASSEMBLY

(75) Inventor: Corey J. Alley, Madeira Beach, FL (US)

(73) Assignee: Profile Racing, Inc., St. Petersburg, FL (US)

( * ) Notice: Subject to any disclaimer, the term of this patent is extended or adjusted under 35 U.S.C. 154(b) by 146 days.

(21) Appl. No.: 10/316,408

(22) Filed: Dec. 11, 2002

(65) Prior Publication Data

US 2004/0112168 A1 Jun. 17, 2004

(51) Int. Cl.[7] .............................................. B62K 21/18
(52) U.S. Cl. ..................................... 74/551.1; 403/373
(58) Field of Search .......................... 74/551.1–551.7; 403/7, 47, 104, 108, 167, 373, 374.1–374.4, DIG. 9

(56) References Cited

U.S. PATENT DOCUMENTS

| | | | | |
|---|---|---|---|---|
| 617,941 A | * | 1/1899 | Sayres | 403/84 |
| 4,310,260 A | * | 1/1982 | Katayama | 403/7 |
| 4,354,399 A | * | 10/1982 | Katayama | 74/551.1 |
| 5,193,930 A | | 3/1993 | Chi | |
| 5,209,138 A | * | 5/1993 | Shu | 74/551.2 |
| 5,253,544 A | * | 10/1993 | Allsop et al. | 74/551.1 |
| 5,373,757 A | | 12/1994 | Bigall | |
| 5,477,747 A | * | 12/1995 | Cheng | 74/551.1 |
| 5,536,102 A | | 7/1996 | Kao | |
| 5,727,427 A | * | 3/1998 | Nien | 74/551.3 |
| 5,881,606 A | | 3/1999 | Roddy | |
| 6,309,135 B1 | | 10/2001 | Thomson et al. | |

* cited by examiner

Primary Examiner—Chong H. Kim
(74) Attorney, Agent, or Firm—Larson & Larson, PA; Herbert W. Larson

(57) ABSTRACT

A rear housing has a vertical bore for receipt of a bicycle fork tube and a horizontal bore for receipt of a movable piston slightly longer than the length of the horizontal bore. A front housing has a concave rear portion cooperating with a concave front portion of the rear housing to form a gripping enclosure for a bicycle handlebar. Threaded bores in the front housing are aligned axially with threaded bores in the rear housing so that tightening down on the front housing to the rear housing with threaded bolts causes the handlebar to be gripped tightly and the movable piston is urged backwardly to tightly hold the fork tube.

1 Claim, 5 Drawing Sheets

BICYCLE HANDLEBAR-FORK CLAMP ASSEMBLY

BACKGROUND OF THE INVENTION

This invention relates to a clamp assembly for joining a bicycle handlebar to a fork tube. More particularly, it refers to a movable piston inside a clamp joining a bicycle handlebar to a fork tube.

Most bicycle manufacturers employ a split clamp design to join the handlebars to the fork tube. This involves splitting a fork clamp and using bolts or screws to construct the handlebar stem around the fork tube. The stem is secured to the fork by tightening split fasteners.

Typical prior art methods and assembly devices for securing handlebars to a fork tube are shown in U.S. Pat. Nos. 5,193,930; 5,373,757; 5,536,102; 5,881,606 and 6,309,135. None of these prior art methods and assembly devices provide a simple one step method of joining a bicycle handlebar to its fork tube employing a movable piston. Such a one step method is needed to simplify bicycle construction and repair.

SUMMARY OF THE INVENTION

The above problem is solved with a three piece clamp assembly. A rear housing has a vertical bore for receipt of a fork tube and a horizontal bore enclosing a movable piston, the piston being slightly longer than the horizontal bore. A front housing has a rear concave portion that together with a front concave portion of the rear housing grips a bicycle handlebar when the front housing is attached to the back housing by multiple bolts connecting the front housing and a front portion of the rear housing. As the bolts are tightened, the piston is moved backwards to tightly engage the fork tube.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION OF THE INVENTION

Figure 1:
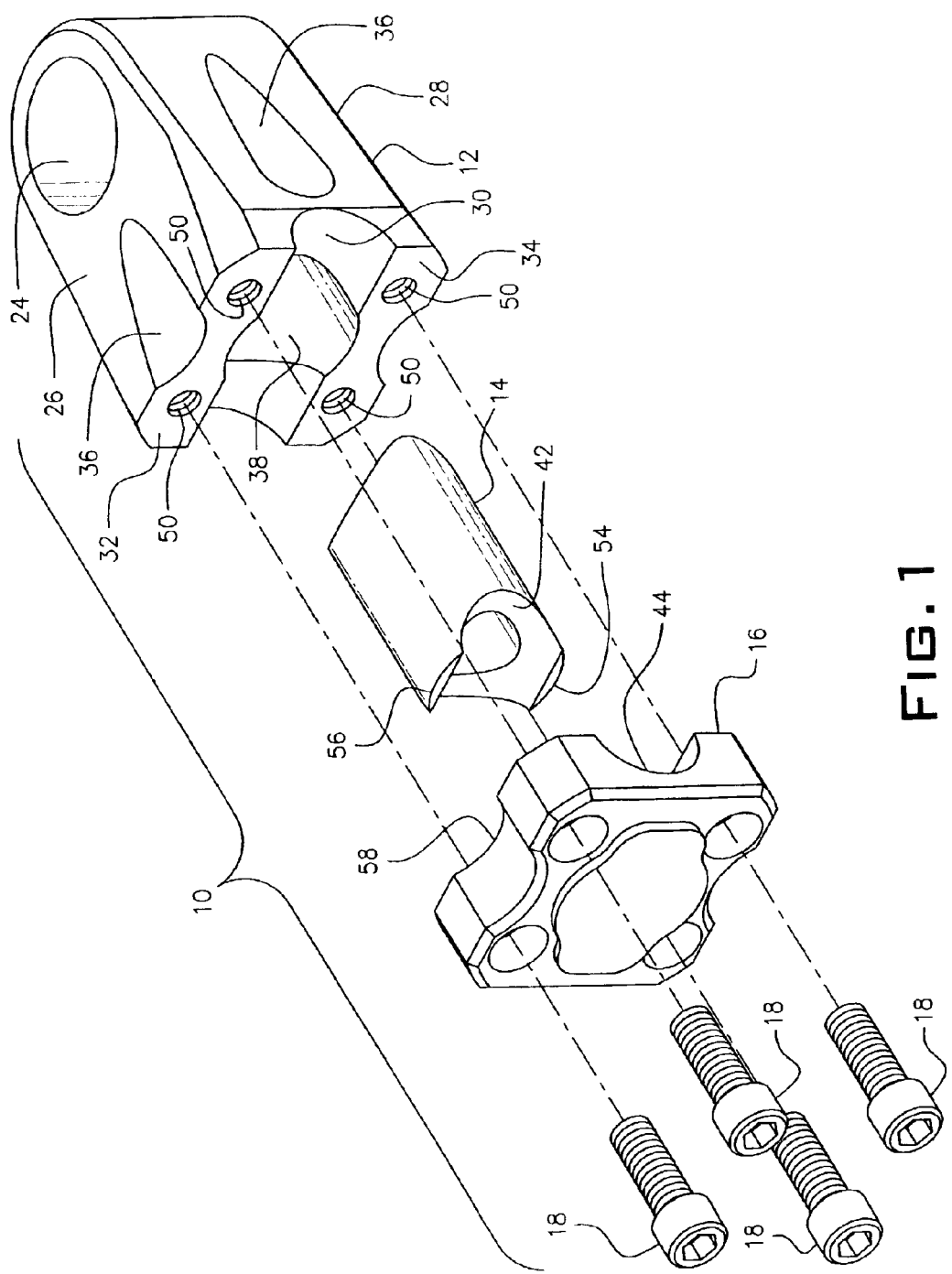
FIG. 1 is an exploded view of the clamp assembly of this invention.

Throughout the following detailed description, the same reference numerals refer to the same elements in all figures.

Figure 2:
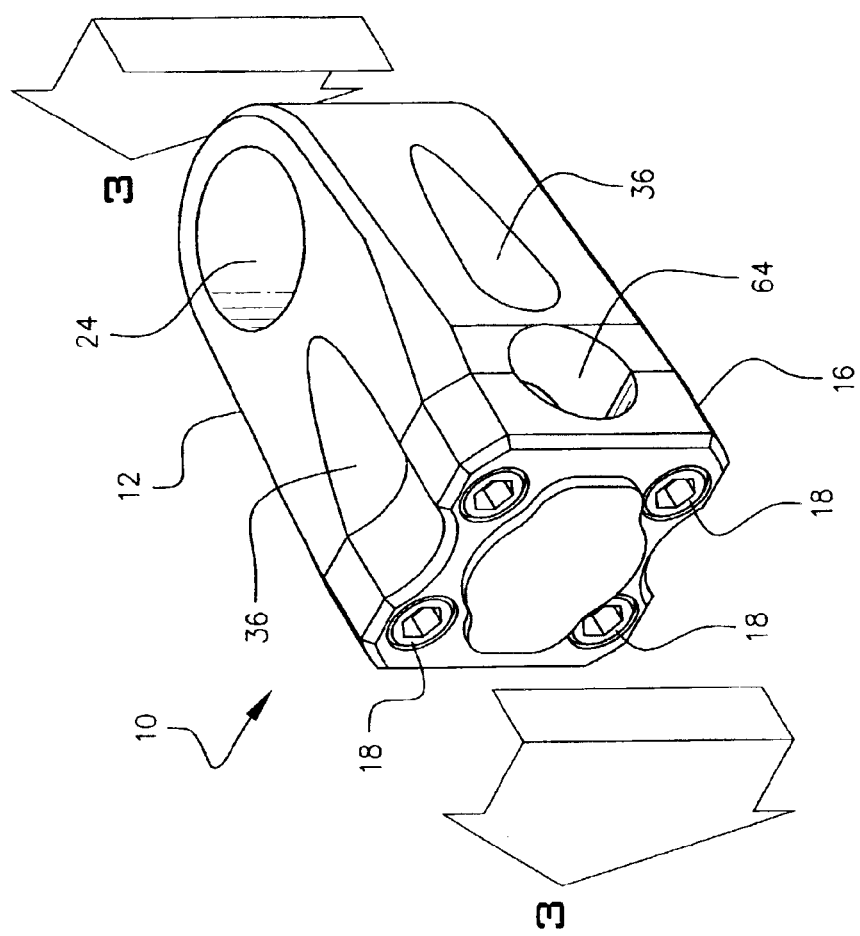
FIG. 2 is a perspective view of the clamp assembly prior to joining a handlebar to a fork tube.
Figure 3:
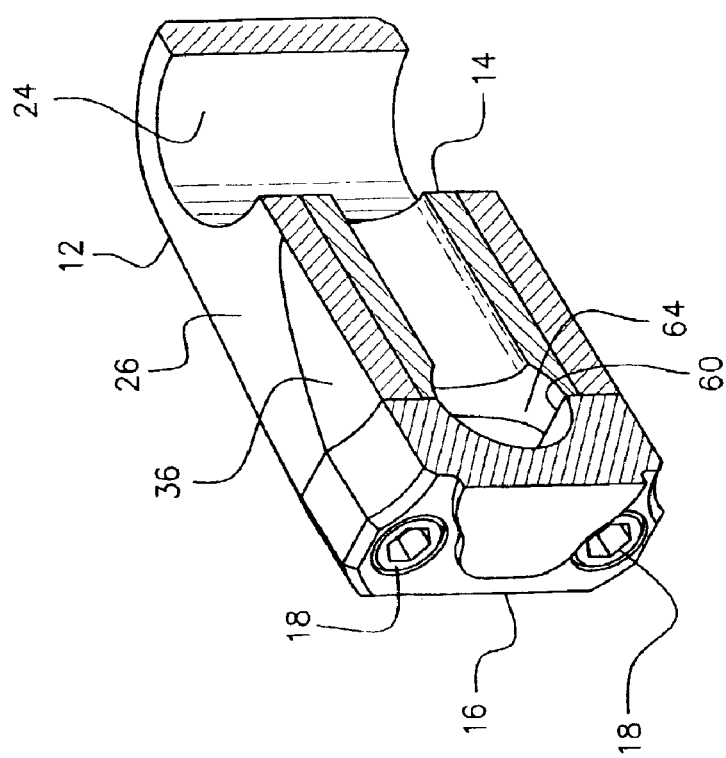
FIG. 3 is a sectional view along line 3—3 of FIG. 2.
Figure 4:
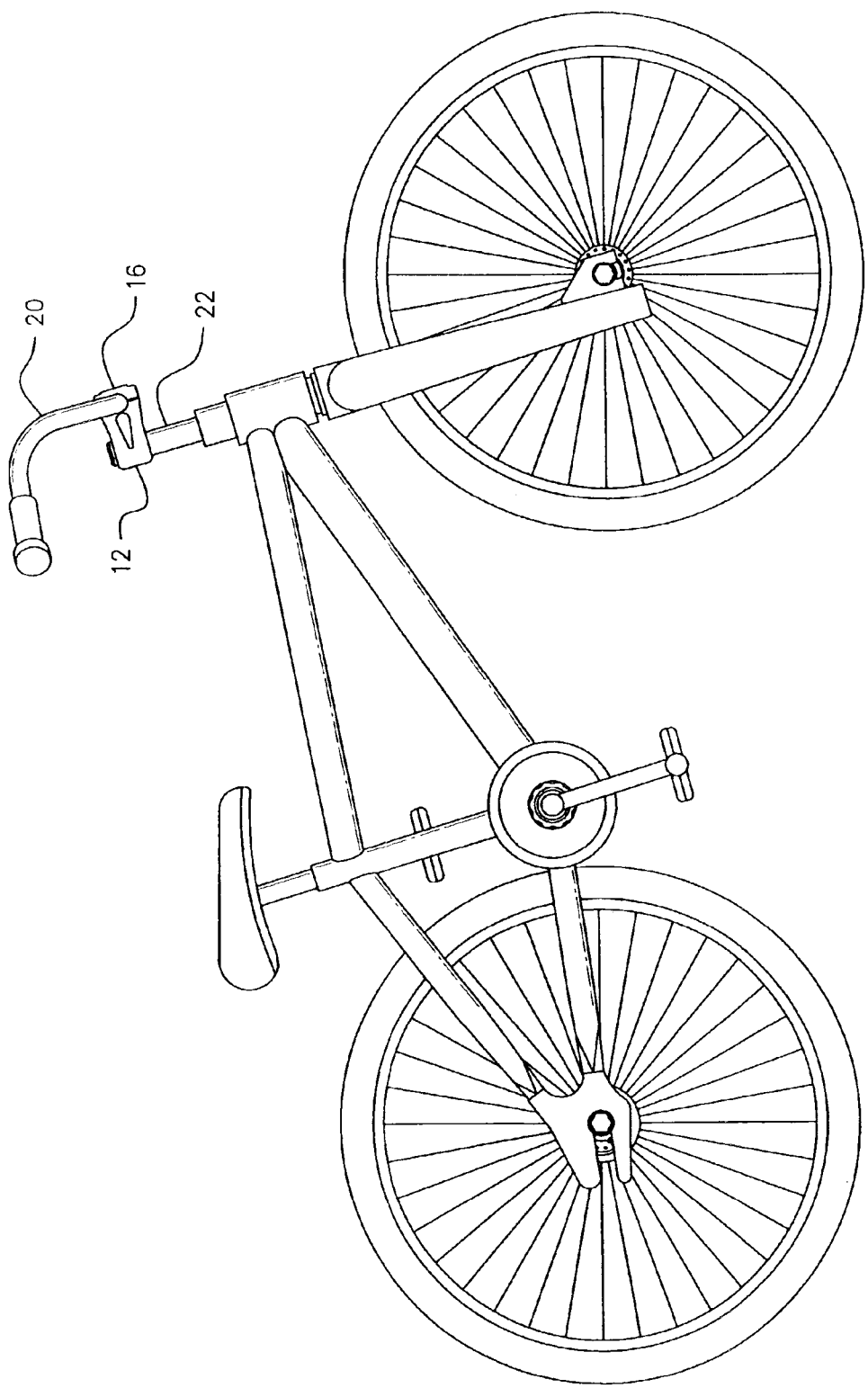
FIG. 4 is an elevational side view of a bicycle mounting a handlebar to a fork tube with the inventive clamp assembly.
Figure 5:
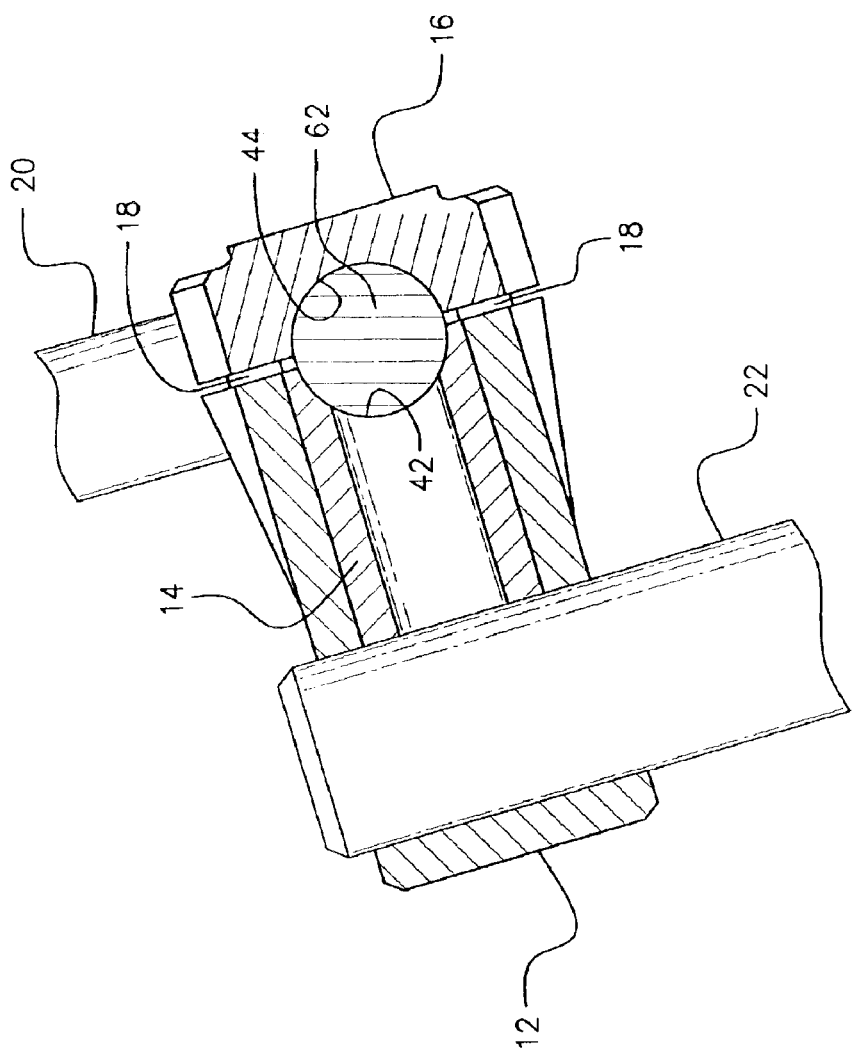
FIG. 5 is a sectional view of the clamp assembly connecting the bicycle handlebars to the fork tube shown in FIG. 4.

The clamp assembly 10 of this invention shown in FIGS. 1 and 2, has a rear housing 12, a movable hollow piston 14 and a front housing 16, together with multiple bolts 18 to fasten the clamp assembly components over a bicycle handlebar 20 and fork 22 shown in FIGS. 4 and 5.

The rear housing 12 has a vertical bore 24 through a top surface 26 and a bottom surface 28. A horizontal bore 38 begins at an intersection with bore 24 and continues through to a concave surface 30 on a front portion of housing 12. Planar surfaces 32 and 34 at a front face of the housing 12 each has two threaded horizontal bores 50 on each side for receipt of threaded bolts 18. Decorative depressions 36 are formed on all sides of rear housing 12.

The hollow piston 14 is movable within bore 38 of rear housing 12, and is slightly longer than bore 38. The piston 14 has a concave rear end 40 and a concave front end 42.

Front housing 16 has a concave 44 rear portion and planar surfaces 46 and 48 that align with planar surfaces 32 and 34 on rear housing 12. Each planar surface 46 and 48 has threaded bores 52 on each side. Bores 52 are axially aligned with bores 50 when bolts 18 are inserted to tighten the clamp assembly 10. When the clamp assembly 10 is tightened together forward edges 54 and 56 at the leading front edge of piston 14 is stopped by back wall portions 60 and 58 respectively on front housing 16.

When joining a bicycle handlebar to a bicycle fork, a horizontal portion 62 of handlebar 20 is placed between rear housing 12 and front housing 16 in opening 64 and the bolts 18 are lightly tightened. The bore 24 is then occupied by the fork 22 and the bolts 18 are tightened down to force piston 14 to exert pressure on both fork 22 and handlebar portion 62 to lock them in position.

The clamp components are made from high strength aluminum, or steel.

Equivalent components can be substituted for the components set forth herein to accomplish substantially the same function in substantially the same way to create substantially the same result.

Having described the invention, what is claimed follows:

1. Method of mounting a bicycle handlebar to a fork tube comprising:

providing a clamp assembly having a vertical through bore in a rear housing and inserting a top portion of the fork tube through the vertical through bore;

providing a horizontal bore in the rear housing, the horizontal bore directed forward from the fork tube to a concave front portion of the rear housing and a pair of planar front faces above and below the concave front portion on the rear housing, the planar surfaces containing threaded bores and positioning a movable piston in the horizontal bore;

providing a front housing having a concave rear portion and a pair of planar rear faces above and below the concave rear portion, the planar rear faces having multiple threaded bores axially aligned with the threaded bores in the rear housing; and inserting a horizontal portion of the handlebar between the front and rear housing and tightening down on multiple threaded bolts in the threaded bores to cause the handlebar to be gripped between the concave surfaces of the front and rear housing and causing the piston to press against the fork tube to hold it in position.

* * * * *